United States Patent [19]

Occelli

[11] Patent Number: 5,030,432
[45] Date of Patent: Jul. 9, 1991

[54] CRYSTALLINE GALLIOSILICATE WITH THE ZEOLITE OMEGA STRUCTURE

[75] Inventor: Mario L. Occelli, Yorba Linda, Calif.

[73] Assignee: Union Oil Company of California, Los Angeles, Calif.

[21] Appl. No.: 423,026

[22] Filed: Oct. 18, 1989

[51] Int. Cl.⁵ ............................................. C01B 33/20
[52] U.S. Cl. ....................................... 423/328; 502/61
[58] Field of Search ............... 423/326, 328, 329, 330; 502/61, 71; 208/111

[56] References Cited

U.S. PATENT DOCUMENTS

| | | | |
|---|---|---|---|
| 3,431,219 | 3/1969 | Argauer | 423/328 |
| 3,642,434 | 2/1972 | Dwyer | 423/329 |
| 3,923,639 | 12/1975 | Ciric | 208/111 |
| 4,241,036 | 12/1980 | Flanigen et al. | 423/328 |
| 4,331,643 | 5/1982 | Rubin et al. | 423/329 |
| 4,377,502 | 3/1983 | Klotz | 423/328 |
| 4,430,573 | 7/1982 | Vaughan et al. | 423/328 |
| 4,495,303 | 1/1985 | Kuehl | 423/328 |
| 4,521,297 | 6/1985 | Angevine et al. | 423/328 |
| 4,523,047 | 6/1985 | Chester et al. | 502/71 |
| 4,803,060 | 2/1989 | Occelli | 423/326 |

FOREIGN PATENT DOCUMENTS 1178186 1/1970 Canada .

OTHER PUBLICATIONS

Jarman et al., "Interpretation of the Silicon-29 Nuclear Magnetic Resonance Spectra of Zeolites: Synthetic Mazzite", J. Phys. Chem. 88 (1984), pp. 5748–5752.

Newsam et al., "Structural Characterization of Synthetic Gallium Mazzite", Mat. Res. Bull. 20 (1985), pp. 125–136.

J. M. Newsam, D. E. W. Vaughan, "Structural Studies of Gallosilicate Zeolites," *New Developments in Zeolite Science and Technology,* Proceedings of the 7th International Zeolite Conference, Tokyo, 1986, 457–464.

*Primary Examiner*—H. M. S. Sneed
*Assistant Examiner*—R. Bruce Breneman
*Attorney, Agent, or Firm*—Yale S. Finkle; Gregory F. Wirzbicki

[57] ABSTRACT

A crystalline, galliosilicate molecular sieve of the zeolite omega structure and having the following composition expressed in terms of oxide mole ratios in the anhydrous state:

$$Ga_2O_3 : xSiO_2 : yM_2O$$

where M is an alkali metal, preferably sodium, x equals 5 to 30, preferably 5 to 15, and y equals about 1.0. The crystalline, galliosilicate molecular sieve of the invention is crystallized in the absence of a templating agent from a mixture of a substantially alumina-free hydrogel containing gallia and a substantially alumina-free galliosilicate solution. The resultant sieve may be employed, after reducing its alkali metal content, as a component of a catalyst which can be used in a variety of chemical conversion processes.

14 Claims, No Drawings

CRYSTALLINE GALLIOSILICATE WITH THE ZEOLITE OMEGA STRUCTURE

BACKGROUND OF THE INVENTION

This invention relates to crystalline galliosilicates and is particularly concerned with a crystalline galliosilicate molecular sieve having the zeolite omega structure, methods of producing such a molecular sieve, catalysts containing such a molecular sieve and processes for using catalysts containing such a molecular sieve.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimensions while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

The pore size of a zeolite can vary from about 2.6 Angstroms for analcime to about 10.0 Angstroms for zeolite omega. The term "pore size" as used herein refers to the diameter of the largest molecule that can be sorbed by the particular zeolite or other molecular sieve in question. The measurement of such diameters and pore sizes is discussed more fully in Chapter 8 of the book entitled "Zeolite Molecular Sieves," written by D. W. Breck and published by John Wiley & Sons in 1974, the disclosure of which book is hereby incorporated by reference in its entirety. The pore size range of 2.6 to 10.0 Angstroms is particularly suited for molecular separation and catalytic processing. Analcime will sorb ammonia while excluding larger molecules whereas zeolite omega will sorb perfluorotributyl amine $[(C_4F_9)_3N]$ while excluding any molecule having a diameter greater than about 10.0 Angstroms. All of the other approximately 150 zeolites now known have pore sizes falling within the range between 2.6 and 10.0 Angstroms.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolite" or "zeolitic" as used herein refers to molecular sieves whose frameworks are formed of substantially only silicon and aluminum atoms in tetrahedral coordination with oxygen atoms. One such class of new molecular sieves that has been created is that in which all the framework aluminum has been replaced by gallium. Specifically, it has been reported in the literature that galliosilicate molecular sieves having the faujasite structure, the pentasil structure and the mordenite structure have been synthesized. The synthesis of a galliosilicate analogue of Theta-1 zeolite has also been reported. It is believed, however, that there has been no reported instance of a substantially alumina-free galliosilicate with the zeolite omega structure having been synthesized.

Accordingly, it is one of the objects of the present invention to provide a crystalline, galliosilicate molecular sieve free of alumina with the zeolite omega structure and a method for preparing such a molecular sieve, which sieve may be useful in many types of chemical conversion processes, particularly hydrocarbon conversion processes. This and other objects of the invention will become more apparent in view of the following description of the invention.

SUMMARY OF THE INVENTION

In accordance with the invention, it has now been found that a crystalline, galliosilicate molecular sieve comprising silicon, gallium and oxygen and having the zeolite omega crystal structure can be synthesized by mixing, normally in the absence of a templating or directing agent, a source of gallia, a source of silica, a source of an alkali metal and water to form a hydrogel substantially free of alumina in which the components have the following oxide mole ratios:

$SiO_2/Ga_2O_3$ = 5 to 40
$M_2O/Ga_2O_3$ = 2 to 10
$H_2O/Ga_2O_3$ = 80 to 800 where M is an alkali metal. After the above-described hydrogel is formed, it is mixed with a galliosilicate solution substantially free of alumina prepared in the same manner as the hydrogel, i.e., by mixing, in the absence of a templating or directing agent, a source of gallia, a source of silica, a source of an alkali metal and water. Unlike in the hydrogel, however, the $M_2O/Ga_2O_3$ mole ratio is sufficiently large to prevent gel formation, or, if a gel does form, to facilitate dissolution of the gel upon vigorous stirring. The components comprising the solution are typically present in the following oxide mole ratios:

$SiO_2/Ga_2O_3$ = 5 to 30

-continued
$M_2O/Ga_2O_3 = 6\ to\ 20$
$H_2O/Ga_2O_3 = 200\ to\ 800$

After the galliosilicate solution is added to the hydrogel, the mixture is crystallized, normally without vigorous agitation and in the absence of a templating or directing agent, at a temperature below about 200° C. to form a crystalline, galliosilicate molecular sieve having the zeolite omega structure. This molecular sieve, which is substantially free of alumina and aluminum, typically has the composition, expressed in terms of oxide mole ratios in the anhydrous state, of:

$Ga_2O_3{:}xSiO_2{:}yM_2O$ where M is an alkali metal, preferably sodium, x equals 5 to 30 and y equals about 1.0. The X-ray powder diffraction pattern of the molecular sieve contains at least the d-spacings set forth in Table 1 below, which d-spacings are characteristic of a zeolite with the omega type structure.

TABLE 1

| Interplanar d-spacings (Angstroms) | Relative Intensity (100 × I/I$_o$) |
|---|---|
| 15.9 ± 0.50 | 4–40 |
| 9.6 ± 0.40 | 20–100 |
| 7.9 ± 0.40 | 5–50 |
| 6.9 ± 0.20 | 5–30 |
| 5.9 ± 0.20 | 10–70 |
| 5.6 ± 0.15 | 40–80 |
| 3.4 ± 0.15 | 40–100 |
| 3.2 ± 0.15 | 10–40 |
| 2.9 ± 0.10 | 30–80 |
| 2.5 ± 0.10 | 5–40 |

DETAILED DESCRIPTION OF THE INVENTION

The crystalline, galliosilicate molecular sieve of the invention is prepared by crystallizing a mixture of a hydrogel and a galliosilicate solution, both of which are separately formed, normally in the absence of an organic templating or directing agent, by mixing a source of gallia, a source of silica and a source of an alkali metal with water under conditions such that the various components react to form, respectively, the desired hydrogel and the desired solution. The crystallization is carried out in the absence of an organic templating or directing agent. Since a source of alumina or aluminum is not used in forming either the hydrogel or the solution, the only alumina or aluminum present in the hydrogel, the galliosilicate solution or the crystallized galliosilicate will be alumina or aluminum impurities in the source materials. Thus, the hydrogel, galliosilicate solution and galliosilicate molecular sieve of the invention will normally contain less than about 0.2 weight percent alumina and less than about 0.2 weight percent aluminum, preferably less than about 0.1 weight percent of each, and will usually be substantially free of both alumina and aluminum.

The silica used in forming the hydrogel and galliosilicate solution may be in the form of sodium silicate, silica hydrosols, silica gels, inorganic silica salts, silicic acid gels, aerosils, silicic acid sols, organic salts such as tetramethylammonium silicate and methyltriethoxysilane, and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal solutions of silica particles.

The source of alkali metal used in forming the hydrogel and galliosilicate solution may be any alkali metal salt or hydroxide, however, a sodium salt or hydroxide is normally preferred. It is possible for the source of alkali metal to also be the source of gallia utilized to form the hydrogel and galliosilicate solution. Alkali metal gallates are examples of materials which serve as a source of both an alkali metal and gallia.

The gallia used to produce the hydrogel and galliosilicate solution may be in the form of gallium oxide, gallium hydroxide, an alkali metal gallate or an inorganic gallium salt, such as gallium nitrate, gallium sulfate and gallium acetate. As mentioned above, the source of the gallia may also be the source of the alkali metal used to form the hydrogel and galliosilicate solution. In fact, a preferred source of gallia is prepared by dissolving gallium oxide in an aqueous solution of sodium hydroxide to form sodium gallate which is then used as a component to form the hydrogel and the galliosilicate solution.

The hydrogel used to form the mixture from which the galliosilicate molecular sieve of the invention is crystallized is normally prepared by first dissolving the source of gallia in an aqueous solution of an alkali metal hydroxide, preferably sodium hydroxide. The resulting solution is then mixed with a source of silica to form a hydrogel which is vigorously stirred. A sufficient amount of the gallia source, the silica source, the alkali metal source and water is used so that the resultant hydrogel has the following oxide mole ratios of components:

$SiO_2/Ga_2O_3 = 5\ to\ 40,\ preferably\ 10\ to\ 30$
$M_2O/Ga_2O_3 = 2\ to\ 10,\ preferably\ 3\ to\ 6$
$H_2O/Ga_2O_3 = 80\ to\ 800,\ preferably\ 100\ to\ 500$ where M is an alkali metal, preferably sodium.

The galliosilicate solution that is added to the hydrogel to form the crystallization mixture is normally substantially free of alumina and dispersed particles and is typically prepared in a manner similar to that used in preparing the hydrogel. A source of gallia is dissolved in an aqueous alkali metal hydroxide and the resulting solution is mixed with a silica source. A sufficient amount of the gallia source, the silica source, the alkali metal source and water is used so that the resultant mixture contains the following oxide mole ratios of components:

$SiO_2/Ga_2O_3 = 5\ to\ 30,\ preferably\ 10\ to\ 20$
$M_2O/Ga_2O_3 = 6\ to\ 20,\ preferably\ 8\ to\ 15$
$H_2O/Ga_2O_3 = 200\ to\ 800,\ preferably\ 300\ to\ 500$ Generally, a sufficient amount of the alkali metal source is used so that the $M_2O/Ga_2O_3$ mole ratio is such that a gel is not formed when the components are mixed together or, if a gel is formed upon the mixing of the components, it can be forced into solution by stirring at ambient temperature.

After the hydrogel and the galliosilicate solution have been separately prepared, a sufficient amount of the solution is added slowly to the hydrogel so that the resultant mixture, which remains in a gel form, contains between about 1 and about 40 weight percent of the solution, preferably between about 10 and 30 weight percent. Normally, the oxide mole ratios of components in the resultant mixture will fall within the same ranges as the oxide mole ratios of components in the starting hydrogel. The mixture is then stirred at atmospheric pressure and at a temperature between about 20° C. and about 60° C., preferably at about ambient temperature, for from about 1 hour to about 2 days, preferably between about 1 hour and about 10 hours. After stirring, the mixture is crystallized by heating, normally in the absence of vigorous stirring or agitation, for between about 1 day and 10 days, usually between about 2 days and 6 days, at a temperature in the range between about 90° C. and 200° C., preferably between about 100° C. and 150° C. The temperature is normally controlled within the above ranges in order to prevent the formation of phase impurities. After the mixture has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water. Since an organic templating or directing agent is normally not present in the mixture which is crystallized, these dried crystals will typically contain no traces of such an agent or cations, such as tetramethylammonium cations, which are formed when such an agent is dissolved in water.

The dried crystals produced as described above comprise the molecular sieve of the invention and will normally have the following composition expressed in terms of oxide mole ratios in the anhydrous state:

$Ga_2O_3 : xSiO_2 : yM_2O$ where M is an alkali metal, preferably sodium, x equals 5 to 30, preferably 5 to 15, and y equals about 1.0. The X-ray powder diffraction pattern of the crystallized molecular sieve of the invention will typically contain at least the d-spacings set forth in Table 1, preferably the d-spacings set forth in Table 2 below.

TABLE 2

| Bragg Angle 2-Theta (Degrees) | Interplanar d-spacings (Angstroms) | Relative Intensity (100 × I/I$_o$) |
|---|---|---|
| 5.4–5.9 | 16.315–14.967 | 4–40 |
| 9.5–9.9 | 9.3017–8.9267 | 20–100 |
| 11.0–11.4 | 8.0364–7.7553 | 5–50 |
| 12.7–13.1 | 6.9642–6.7525 | 5–30 |
| 14.6–15.0 | 6.0619–5.9012 | 10–70 |
| 15.6–16.2 | 5.6755–5.4666 | 40–80 |
| 18.5–18.9 | 4.7919–4.6913 | 5–40 |
| 23.2–23.4 | 3.8306–3.7983 | 5–40 |
| 25.0–25.3 | 3.5588–3.5172 | 5–50 |
| 25.8–26.1 | 3.4502–3.4112 | 40–100 |
| 28.0–28.3 | 3.1839–3.1508 | 10–40 |
| 30.3–30.6 | 2.950–2.921 | 30–80 |
| 35.6–35.8 | 2.522–2.508 | 5–40 |

The X-ray powder diffraction data set forth in Tables 1 and 2 are characteristic of a molecular sieve having the zeolite omega structure. For comparison purposes, X-ray powder diffraction data for a crystalline aluminosilicate with the zeolite omega structure are set forth in Table 3. This data was obtained from U.S. Pat. No. 4,241,036, which patent is hereby incorporated by reference in its entirety.

TABLE 3

X-Ray Powder Diffraction Data for a Crystalline Aluminosilicate with the Zeolite Omega Structure

| Interplanar d-spacings (Angstroms) | Relative Intensity (100 × I/I$_o$) |
|---|---|
| 15.95 | 23 |
| 9.09 | 100 |
| 7.87 | 24 |
| 6.86 | 31 |
| 5.94 | 37 |
| 5.47 | 7 |
| 5.25 | 9 |
| 5.19 | |
| 4.695 | 37 |
| 3.909 | 13 |
| 3.794 | 67 |
| 3.708 | 35 |
| 3.620 | 29 |
| 3.516 | 62 |
| 3.456 | 23 |
| 3.13 | 44 |
| 3.074 | 24 |
| 3.02 | |
| 2.911 | 42 |
| 2.640 | 7 |
| 2.488 | 7 |
| 2.342 | 20 |
| 2.272 | 7 |
| 2.139 | 6 |
| 2.031 | 20 |
| 1.978 | 6 |
| 1.909 | 12 |
| 1.748 | 7 |

The X-ray powder diffraction data set forth in Tables 1 and 2 for the crystalline galliosilicate of the invention are based on data obtained using an X-ray diffractometer with graphite-crystal monochromatized Cu-K alpha radiation. The peak heights I and their position as a function of 2-theta, where theta is the Bragg angle, were read from the diffractometer output. From this output the relative intensities, $100 \times I/I_o$, where $I_o$ is the intensity of the strongest peak, were read. The interplanar spacings, d, in Angstroms corresponding to the recorded peaks were then calculated in accordance with standard procedures. It will be understood that the peak heights and d-spacings associated with the X-ray powder diffraction pattern of the galliosilicate molecular sieve of the invention may vary somewhat depending on various factors, e.g., heat treatment, unit cell composition, crystal size, and whether the molecular sieve has been exchanged with hydrogen ions or metal cations.

After the synthesized galliosilicate crystals have been washed and dried, they are typically treated in order to render them active for acid catalyzed reactions. This procedure normally comprises treating the molecular sieve, normally by ion exchange with ammonium ions, hydrogen ions, polyvalent cations, such as lanthanum, cerium, or other rare earth-containing cations, or a combination of ammonium ions, hydrogen ions and polyvalent cations, to reduce its alkali metal content to below about 2.0 weight percent, preferably below about 0.5 weight percent and most preferably below about 0.05 weight percent, calculated as the alkali metal oxide. When reducing the alkali metal content using an ammonium ion exchange technique, the molecular sieve is typically slurried for 1 to 5 hours at a temperature above ambient temperature but less than about 100° C.

in an aqueous solution containing a dissolved ammonium salt, such as ammonium nitrate, ammonium sulfate, ammonium chloride and the like. Ordinarily, to achieve extremely low levels of alkali metal cations, the ion exchange procedure will be repeated at least twice and occasionally several times. After the ammonium exchange or other treatment to reduce alkali metal content, the molecular sieve is calcined in air at a temperature between about 400° C. and about 700° C., preferably between about 500° C. and about 600° C., for between about 5 hours and about 15 hours. Calcination after an ammonium exchange serves to decompose the ammonium cations into ammonia, which is driven off during the calcination step, and thereby produce the catalytically active hydrogen form of the galliosilicate molecular sieve.

The crystalline, galliosilicate molecular sieve of the invention may be used as a component of a catalyst for converting hydrocarbons and other organic compounds, i.e., compounds containing one or more carbon atoms, into more valuable reaction products by acid catalyzed reactions, such as alkylation, transalkylation, dealkylation, isomerization, reforming, dehydrocyclization, e.g., the conversion of low molecular weight aliphatic hydrocarbons into liquids rich in aromatic compounds, dehydrogenation, hydrogenation, cracking, hydrocracking, oligomerization, aromatization, alcohol conversion reactions, the conversion of syngas to mixtures of hydrocarbons, and the like. In utilizing the galliosilicate of the invention as a catalyst component in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite and attapulgite, combinations of the above and the like. The preferred porous, inorganic refractory oxide component will depend upon the particular conversion process involved and will be well known to those skilled in the art. Examples of precursors that may be used include peptized alumina, alumina gels, hydrated alumina, silica-alumina hydrogels, Ziegler-derived aluminas and silica sols. The exact amounts of crystalline galliosilicate and porous, inorganic refractory oxide used in the catalyst of the invention will again depend upon the particular conversion process in which the catalyst is to be used.

It will be understood that, although the primary use of the catalyst of the invention will be in hydrocarbon conversion processes to convert hydrocarbon feedstocks into desirable reaction products, the catalyst can also be used to convert feedstocks or organic compounds other than hydrocarbons into desired reaction products. For example, the catalyst of the invention can be used to convert alcohols into transportation fuels and to convert gaseous mixtures of carbon monoxide and hydrogen into liquids rich in cycloparaffins and aromatic compounds.

Depending on the particular type of conversion process in which the catalyst of the invention is to be used, it may be desirable that the catalyst also contain a metal promoter or combination of metal promoters selected from Group IB, Group IIA, Group IIB, Group IIIA, Group IVA, Group VA, Group VIB, Group VIIB or Group VIII of the Periodic Table of elements. As used herein "Periodic Table of Elements" refers to the version found in the inside front cover of the "Handbook of Chemistry and Physics," 65th Edition, published in 1984 by the Chemical Rubber Company, Cleveland, Ohio. Specific metal components which may be used as promoters include components of copper, silver, zinc, aluminum, barium, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. Depending on the properties of the metal chosen for use as the promoter, it may be ion exchanged into the crystalline galliosilicate itself, it may be incorporated into the mixture of the crystalline galliosilicate and the porous, inorganic refractory oxide, or it may be added by impregnation after the catalyst particles have been formed.

The catalyst of the invention is normally prepared by mulling the crystalline galliosilicate molecular sieve in powder form with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. Among preferred shapes for the die openings ar those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with the galliosilicate of the invention and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in the air at a temperature normally ranging between about 800° F. and about 1100° F. to produce the finished catalyst particles.

In addition to the crystalline, galliosilicate molecular sieve of the invention, the catalyst of the invention may also contain other molecular sieves such as aluminosilicates, borosilicates, aluminophosphates, silicoaluminophosphates, naturally occurring zeolites, pillared clays and delaminated clays. Suitable aluminosilicates for combining with the crystalline galliosilicate of the invention include Y zeolites, ultrastable Y zeolites, X zeolites, zeolite beta, zeolite L, faujasite and zeolite omega. The actual molecular sieve used in combination with the crystalline galliosilicate will depend upon the particular conversion process in which the catalyst of the invention is to be used. The molecular sieve of choice is normally incorporated into the catalyst by mixing the molecular sieve with the crystalline galliosilicate and porous, inorganic refractory oxide prior to mulling and extrusion.

It is typically preferred to use catalysts containing the crystalline galliosilicate molecular sieve of the invention as a dehydrocyclization or oligomerization catalyst in the absence of added hydrogen or in hydroconversion processes such as hydrodenitrogenation, hydrodesulfurization, hydrocracking and isomerization. When used in hydroconversion processes, the catalyst will normally contain hydrogenation components comprising metals selected from Group VIII and/or Group VIB of the Periodic Table of Elements. These hydrogenation metal components are incorporated into the catalyst either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of one or more noble metals such as platinum or palladium or compounds thereof, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten or compounds thereof, it is normally desired that the finished catalyst particles contain between about 1.0 and about 40 weight percent of the hydrogenation metal components, preferably between about 3 weight percent and about 30 weight percent, calculated as the metal oxide.

It may be advantageous in some cases to add a Group IIA metal component such as barium to the crystalline galliosilicate molecular sieve of the invention to modify its acidity prior to forming the catalyst particles and incorporating a Group VIB and/or Group VIII metal component therein. Catalysts containing a Group IIA exchanged galliosilicate molecular sieve of the invention, which sieve has been further promoted with low levels of a noble metal, are particularly useful for catalyzing naphtha reforming and paraffin isomerization reactions.

Feedstocks that may be subjected to hydroconversion processes using the catalyst of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0 reciprocal hours, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

The nature and objects of the invention are further illustrated by the following example, which is provided for illustrative purposes only and not to limit the invention as defined by claims. The example demonstrates a method of synthesizing a crystalline galliosilicate with the zeolite omega structure.

EXAMPLE

A sodium gallate solution is prepared by mixing in a glass beaker gallium oxide of a 99.99% purity with an aqueous solution of sodium hydroxide made by dissolving commercial grade sodium hydroxide crystals in distilled water. The mixture of gallium oxide and sodium hydroxide is vigorously stirred under boiling conditions until the gallium oxide is completely dissolved. After stirring, Ludox HS-40, a silica sol solution manufactured and sold by the DuPont Chemical Company, is added dropwise to a portion of the stirred mixture to form a hydrogel. The resultant hydrogel is stirred at room temperature until the gel passes into solution generating a clear liquid galliosilicate solution having the following composition expressed in terms of oxide mole ratios:

$$Ga_2O_3:15\ SiO_2:10\ Na_2O:400\ H_2O$$

In a second glass beaker, Ludox HS-40 silica sol solution is added dropwise to a portion of the sodium gallate solution that was prepared in the first beaker to form a hydrogel with the following composition expressed in terms of oxide mole ratios:

$$Ga_2O_3:14.5\ SiO_2:3.0\ Na_2O:110\ H_2O$$

After the hydrogel is formed, a sufficient amount of the galliosilicate solution prepared in the first container is slowly added to the second container so that the resultant mixture has the following composition expressed in terms of oxide mole ratios:

$$Ga_2O_3:16.0\ SiO_2:4.0\ Na_2:150\ H_2O$$

The mixture of the hydrogel and the galliosilicate solution, which is itself a gel, is then placed in a 750 ml teflon-lined autoclave and stirred at ambient temperature for about 4 hours after which the temperature is slowly raised to about 150° C. At this temperature stirring is terminated, and the mixture is allowed to crystallize without stirring or agitation. After 6 days, heating of the autoclave is terminated and the crystalline material therein is collected. The collected crystals are washed with hot distilled water to remove excess reactants and then dried, first at 100° C. for 10 hours and then at 600° C. for 10 hours. The dried crystals have the following composition expressed in terms of oxide mole ratios in the anhydrous state:

$Ga_2O_3:7.85 SiO_2:1.04 Na_2O$

An X-ray powder diffractogram of the crystals is obtained using a Siemens D-500 X-ray diffractometer with graphite-crystal monochromatized Cu-K alpha radiation. The resultant X-ray powder diffraction data including the calculated d-spacings are set forth in Table 4 below.

TABLE 4

X-Ray Powder Diffraction Data for the Crystalline Galliosilicate of the Example

| Bragg Angle 2-Theta (Degrees) | Interplanar d-spacings (Angstroms) | Relative Intensity (100 × $I/I_o$) |
|---|---|---|
| 5.551 | 15.9073 | 4.7 |
| 9.647 | 9.1608 | 30.5 |
| 11.136 | 7.9391 | 7.7 |
| 12.819 | 6.9001 | 15.3 |
| 14.764 | 5.9953 | 17.5 |
| 15.770 | 5.6151 | 54.8 |
| 16.745 | 5.2903 | 2.5 |
| 18.242 | 4.8592 | 6.7 |
| 18.777 | 4.7221 | 7.1 |
| 22.439 | 3.9590 | 4.6 |
| 23.314 | 3.8123 | 17.9 |
| 23.892 | 3.7215 | 7.0 |
| 24.479 | 3.6335 | 6.5 |
| 25.192 | 3.5323 | 17.1 |
| 25.925 | 3.4341 | 100.0 |
| 28.137 | 3.1689 | 20.0 |
| 28.784 | 3.0991 | 9.0 |
| 29.278 | 3.0480 | 6.3 |
| 29.817 | 2.9940 | 4.5 |
| 30.487 | 2.9297 | 53.7 |
| 33.227 | 2.6942 | 7.8 |
| 35.768 | 2.5084 | 15.3 |
| 36.968 | 2.4297 | 7.3 |
| 40.445 | 2.2284 | 2.5 |
| 41.537 | 2.1724 | 2.8 |
| 42.749 | 2.1135 | 2.0 |
| 47.470 | 1.9138 | 3.8 |

The X-ray powder diffraction data set forth in Table 4 are substantially similar to those set forth in Table 3 for a crystalline aluminosilicate or synthetic zeolite with the zeolite omega structure. Thus, it is concluded that the crystalline galliosilicate synthesized in the Example has the zeolite omega structure. Differences in d-spacings and the relative intensities set forth in Tables 3 and 4 result mainly from the different unit cell composition and crystal size of the two molecular sieves.

The dried crystals of the galliosilicate formed in the autoclave are subjected to calcination in flowing air at a temperature of 600° C. The resultant crystals have a BET surface area of about 330 m²/gram and retain about 100 percent of their original crystallinity.

It will be apparent from the foregoing that the invention provides a crystalline, galliosilicate molecular sieve having the zeolite omega structure and methods for preparing such a sieve. Catalysts containing such a molecular sieve are useful in a variety of chemical conversion processes, particularly hydrocarbon conversion processes such as isomerization, hydrocracking, hydrodesulfurization, hydrodenitrogenation, and the conversion of low molecular weight aliphatic hydrocarbons and synthesis gas into liquids rich in aromatic compounds.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for preparing a crystalline, galliosilicate molecular sieve free of an organic templating agent and having the zeolite omega structure which comprises:
   (a) mixing a hydrogel free of an organic templating agent and having the following oxide mole ratios of components:

$SiO_2/Ga_2O_3 = 5$ to $40$
   $M_2O/Ga_2O_3 = 2$ to $10$
   $H_2O/Ga_2O_3 = 80$ to $800$ with a galliosilicate solution free of an organic templating agent and substantially free of alumina, said solution having the following oxide mole ratios of components $SiO_2/Ga_2O_3 = 5$ to $30$
   $M_2O/Ga_2O_3 = 6$ to $20$
   $H_2O/Ga_2O_3 = 200$ to $800$ to form a mixture of said hydrogel and said solution, wherein M is an alkali metal and said mixture has oxide mole ratios of components falling within the same ranges as the oxide mole ratios of components in said hydrogel; and
   (b) crystallizing said mixture to form a galliosilicate molecular sieve free of an organic templating agent and having the zeolite omega structure.

2. A process as defined by claim 1 wherein M is sodium.

3. A process as defined by claim 2 wherein said hydrogel is formed by dissolving gallium oxide in an aqueous solution of sodium hydroxide and adding a source of silica thereto.

4. A process as defined by claim 3 wherein said galliosilicate solution is formed by dissolving gallium oxide in an aqueous solution of sodium hydroxide and adding a source of silica thereto.

5. A process as defined by claim 4 wherein the source of silica used in forming said hydrogel and said solution comprises a silica sol.

6. A process as defined by claim 2 wherein said crystalline molecular sieve having the zeolite omega structure contains less than about 0.2 weight percent aluminum.

7. A process as defined by claim 2 wherein said mixture is crystallized at a temperature between about 90° C. and about 200° C.

8. A process as defined by claim 2 wherein said $Na_2O/Ga_2O_3$ mole ratio in said galliosilicate solution is between about 8 and about 15.

9. A process as defined by claim 2 wherein said hydrogel has the following oxide mole ratios of components $SiO_2/Ga_2O_3 = 10$ to $30$
$M_2O/Ga_2O_3 = 3$ to $6$
$H_2O/Ga_2O_3 = 100$ to $500$.

10. A process as defined by claim 9 wherein said galliosilicate solution has the following oxide mole ratios of components SiO$_2$/Ga$_2$O$_3$ = 10 to 20
M$_2$O/Ga$_2$O$_3$ = 8 to 15
H$_2$O/Ga$_2$O$_3$ = 300 to 500.

11. A process as defined by claim 2 wherein said galliosilicate molecular sieve having the zeolite omega structure has the following composition expressed in terms of oxide mole ratios in the anhydrous state Ga$_2$O$_3$:xSiO$_2$:yNa$_2$O wherein x equals 5 to 30 and y is approximately 1.0.

12. A process as defined by claim 11 wherein x equals 5 to 15.

13. A process as defined by claim 11 wherein said mixture of said hydrogel and said solution is formed by adding said solution to said hydrogel.

14. A process as defined by claim 1 wherein said mixture of said hydrogel and said galliosilicate solution contains between about 10 and 30 weight percent of said solution.

* * * * *